(12) United States Patent
Cho

(10) Patent No.: US 11,827,120 B2
(45) Date of Patent: Nov. 28, 2023

(54) BRAKING CONTROL METHOD USING PREDICTED FRICTION COEFFICIENT OF BRAKE PAD

(71) Applicants: Hyundai Motor Company, Seoul (KR); Kia Corporation, Seoul (KR)

(72) Inventor: Sung Hyun Cho, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 276 days.

(21) Appl. No.: 17/374,711

(22) Filed: Jul. 13, 2021

(65) Prior Publication Data

US 2022/0176826 A1    Jun. 9, 2022

(30) Foreign Application Priority Data

Dec. 8, 2020 (KR) .................. 10-2020-0170621

(51) Int. Cl.
*B60W 10/18* (2012.01)
*B60L 7/26* (2006.01)
*B60W 30/18* (2012.01)

(52) U.S. Cl.
CPC .............. *B60L 7/26* (2013.01); *B60W 10/18* (2013.01); *B60W 30/18127* (2013.01);
(Continued)

(58) Field of Classification Search
CPC ...... B60T 2270/604; B60T 1/10; B60T 17/22; B60T 8/56; B60T 8/18; B60T 13/662;
(Continued)

(56) References Cited

U.S. PATENT DOCUMENTS 8,498,802 B2 *   7/2013   Yamamoto .......... F02N 11/0833
                                                                701/41
2002/0005307 A1 *  1/2002  Irie ...................... B60K 28/16
                                                                180/197
(Continued)

FOREIGN PATENT DOCUMENTS

CN        107963075 A   *   4/2018   ......... B60G 17/0165
CN        111086498 A   *   5/2020
(Continued)

OTHER PUBLICATIONS

JP2011156983A.english.translate, Braking Force Control Device for Vehicle, Toyota Motor Corp, Yotsuya Koji (Year: 2011).*
(Continued)

*Primary Examiner* — B M M Hannan
(74) *Attorney, Agent, or Firm* — MORGAN, LEWIS & BOCKIUS LLP

(57) ABSTRACT

A braking control method using a predicted friction coefficient of a brake pad in a braking apparatus, which may predict a friction coefficient of a brake pad according to the traveling situation in real time using a wheel velocity, a brake disc temperature, and a braking hydraulic pressure, may include determining a target braking torque determined using the predicted friction coefficient, and then allowing the determined target braking torque to be reflected to a real braking torque through a feedforward control, upon a hydraulic braking control for securing the traveling stability of a vehicle or upon a cooperative control between the regenerative braking and the hydraulic braking, improving the accuracy and response speed of the braking control.

17 Claims, 10 Drawing Sheets

(52) U.S. Cl.
CPC ... *B60W 2510/184* (2013.01); *B60W 2520/14* (2013.01); *B60W 2540/12* (2013.01); *B60W 2555/20* (2020.02); *B60W 2710/083* (2013.01); *B60W 2710/18* (2013.01)

(58) Field of Classification Search
CPC .............. B60T 2201/12; B60T 2250/02; B60T 2250/03; B60T 2270/60; F16D 2066/005; F16D 61/00; F16D 66/00; F16D 65/122; F16D 65/78; F16D 2500/70631; B60L 3/12; B60L 7/18; B60L 15/2009
USPC .......................................................... 701/70
See application file for complete search history.

(56) References Cited

U.S. PATENT DOCUMENTS

| | | | |
|---|---|---|---|
| 2003/0036839 A1* | 2/2003 | Han | F16H 61/66 701/84 |
| 2009/0187320 A1* | 7/2009 | Antanaitis | B60L 3/0076 701/70 |
| 2010/0023213 A1* | 1/2010 | Mizuno | B62D 17/00 701/37 |
| 2016/0025160 A1* | 1/2016 | Kim | F16D 48/066 701/67 |
| 2016/0052494 A1* | 2/2016 | Yamamoto | B60T 8/4872 701/70 |
| 2016/0280191 A1* | 9/2016 | Okano | B60T 8/17 |
| 2020/0331447 A1* | 10/2020 | Lee | B60T 17/221 |
| 2021/0031776 A1* | 2/2021 | Shibata | G09G 5/38 |

FOREIGN PATENT DOCUMENTS

| | | | | | |
|---|---|---|---|---|---|
| CN | 113002516 | A | * | 6/2021 | ............ B60L 3/0076 |
| EP | 3023311 | A1 | * | 5/2016 | ................ B60T 1/10 |
| EP | 3747715 | A1 | * | 12/2020 | .......... B60T 8/17554 |
| JP | H1148944 | A | * | 2/1999 | |
| JP | 2001171504 | A | * | 6/2001 | |
| JP | 2005319905 | A | * | 11/2005 | |
| JP | 2005319913 | A | * | 11/2005 | .............. B60T 8/172 |
| JP | 2007191010 | A | * | 8/2007 | |
| JP | 2011156983 | A | * | 8/2011 | |
| JP | 2019015680 | A | * | 1/2019 | |
| JP | 2020196358 | A | * | 12/2020 | |
| JP | 2020200020 | A | * | 12/2020 | ............ B60T 13/662 |
| KR | 20130048484 | A | * | 5/2013 | |
| KR | 102267940 | B1 | * | 3/2021 | |
| WO | WO-2013089225 | A1 | * | 6/2013 | .............. B60L 11/14 |
| WO | WO-2017086277 | A1 | * | 5/2017 | .............. B60T 13/12 |
| WO | WO-2021107501 | A1 | * | 6/2021 | .............. B60T 13/74 |
| WO | WO-2022122298 | A1 | * | 6/2022 | |

OTHER PUBLICATIONS

KR20210026376.english.translate, Airfoil Shape Plate for Disk Brake and Braking Module Having Thesame, Krri, Lee et al. (Year: 2021).*

JP2019015680A.English.translate, Brake Simulation Method of Tire, Sumitomo Rubber Ind., Univ Kyushu, Matsunaga et al. (Year: 2019).*

JPH1148944.english.translate, Brake Fluid Pressure Controller, Toyota Motor Corp (Year: 1999).*

JP5982808B2.english.translate, Braking Torque Control Device, Nissan Motor Co Ltd., Higuchi et al. (Year: 2016).*

KR20130048484A.English.translate, Braking Control Method and Coefficient of Friction of Brakingpad Estimation Method for Vehicle, Mando Corporation, Kim et al. (Year: 2013).*

JPH10258721A.English.translate, Attitude Controller of Vehicle, Mazda Motor, Tomomi et al. (Year: 1998).*

* cited by examiner

BRAKING CONTROL METHOD USING PREDICTED FRICTION COEFFICIENT OF BRAKE PAD

CROSS-REFERENCE TO RELATED APPLICATION

The present application claims priority to Korean Patent Application No. 10-2020-0170621 filed on Dec. 8, 2020, the entire contents of which is incorporated herein for all purposes by this reference.

BACKGROUND OF THE INVENTION

Field of the Invention

The present invention relates to a braking control method using a predicted friction coefficient of a brake pad in a braking apparatus, and more specifically, to a braking control method using a predicted friction coefficient of a brake pad in a braking apparatus, which predicts a friction coefficient of a brake pad, determines a braking torque using a predicted friction coefficient, and then allows the determined braking torque to be reflected to a target braking torque through a feedforward control, improving the accuracy and response speed of the braking control.

Description of Related Art

A hydraulic braking of a vehicle includes a process in which a hydraulic pressure is provided to a wheel cylinder of a caliper, a process in which a piston portion of the wheel cylinder presses a brake pad, and a process in which the brake pad is in friction contact with the surface of a brake disc rotating with tires for the substantial braking.

Upon such a braking, a friction coefficient of the brake pad is known as being continuously or nonlinearly changed according to the temperature of the brake disc, the braking hydraulic pressure, and the rotation velocity of the disc according to a vehicle velocity.

As an example of the related art, upon the braking control for securing the traveling stability of the vehicle, a method for feedback-controlling the braking hydraulic pressure using detection signals such as a wheel slip rate, a vehicle deceleration, and a vehicle yaw rate is applied, but there is a disadvantage in that the response delay for a braking target torque arrival occurs due to the time delay according to the feedback control of the braking hydraulic pressure using the detection signals, and There is a disadvantage in which an accurate braking torque may not be obtained by not reflecting a change in the friction coefficient of the brake pad changed according to the traveling situation.

As another example of the related art, upon the hydraulic braking control for securing the traveling stability of the vehicle or a cooperative control between the regenerative braking and the hydraulic braking in the process in which the regenerative braking according to the (−) torque output of a traveling motor is performed together, other than the hydraulic braking in the braking process of the eco-friendly vehicles such as an electric vehicle and a hybrid electric vehicle, a method for estimating the temperature of the brake disc, estimating the friction coefficient from a friction coefficient map according to a preset temperature, and controlling a braking hydraulic pressure using the estimated friction coefficient is applied, but it is difficult to predict the change in the friction coefficient of the brake pad according to the traveling situation such that it is difficult to accurately determine the braking hydraulic pressure for generating the target braking torque, and as a result, there is a problem in that the over braking or the under braking different from the driver's will to brake occurs due to the change in the braking torque according to the friction coefficient.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a braking control method using a predicted friction coefficient of a brake pad in a braking apparatus, which may predict a friction coefficient of a brake pad according to the traveling situation in real time using a wheel velocity, a disc temperature, and a braking hydraulic pressure, determine a target braking torque determined using the predicted friction coefficient, and then allow the determined target braking torque to be reflected to a real braking torque through a feedforward control, upon a hydraulic braking control for securing the traveling stability of a vehicle or a cooperative control between the regenerative braking and the hydraulic braking, improving the accuracy and response speed of the braking control.

Various exemplary embodiments of the present invention for achieving the object provides a braking control method using a predicted friction coefficient of a brake pad in a braking apparatus including: predicting a friction coefficient of the brake pad changed according to a traveling situation of a vehicle; determining a target braking torque for hydraulic braking; determining a braking hydraulic pressure configured for generating the target braking torque using the predicted friction coefficient and the determined target braking torque; and controlling the braking hydraulic pressure which applies the determined braking hydraulic pressure to the braking apparatus.

Another exemplary embodiment of the present invention for achieving the object provides a braking control method using a predicted friction coefficient of a brake pad in a braking apparatus including: predicting a friction coefficient of the brake pad changed according to a traveling situation of a vehicle; determining a regenerative braking execution amount and an execution hydraulic braking torque for a cooperative control of a regenerative braking and a hydraulic braking of the vehicle; determining a braking hydraulic pressure configured for generating the execution hydraulic braking torque using the predicted friction coefficient and the determined execution hydraulic braking torque; and controlling the braking hydraulic pressure which applies the determined braking hydraulic pressure to the braking apparatus.

In the exemplary embodiment and another exemplary embodiment of the present invention, the predicting of the friction coefficient includes: determining a disc temperature of the brake disc using vehicle traveling information in a disc temperature calculation model; inputting a wheel velocity, the braking hydraulic pressure, and the disc temperature determined by the disc temperature calculation model among the vehicle traveling information to a friction coefficient model of a braking controller; and predicting and outputting a friction coefficient in the friction coefficient model based on the wheel velocity, the disc temperature, and the braking hydraulic pressure.

The friction coefficient model is configured to predict one friction coefficient matching with the wheel velocity, the disc temperature, and the braking hydraulic pressure to output the predicted friction coefficient to a braking control logic portion of the controller, wherein the braking control logic portion is engaged to the friction coefficient model.

The determining of the disc temperature includes: estimating the weight of the vehicle based on a change in a tire dynamic radius; determining a braking load; determining heating energy, which is a disc temperature increasing amount, and a thermal energy absorption rate of the brake disc, which is a rate at which thermal energy is absorbed to the brake disc and the brake pad, after converting kinetic energy according to the braking into a thermal energy parameter; determining a disc heating amount by multiplying the heating energy, the thermal energy absorption rate of the brake disc, and an energy conversion efficiency for reflecting a loss when the kinetic energy according to the braking is converted into the thermal energy parameter; and determining a disc temperature by subtracting a convection cooling amount and a radiation cooling amount of the brake disc from a value obtained by summing the disc heating amount and a disc initial temperature.

The braking control method using the predicted friction coefficient of the brake pad according to the exemplary embodiment and another exemplary embodiment of the present invention may further include a real time update step in which a braking hydraulic signal applied to the braking apparatus is input to the friction coefficient model through a friction coefficient model input portion of the controller, wherein the friction coefficient model input portion is engaged to the friction coefficient model.

The braking control method according to the exemplary embodiment of the present invention may further include determining whether a posture of the vehicle is in an unstable state prior to the determining of the target braking torque, in which when it is confirmed that the posture of the vehicle is unstable, the determining of the target braking torque, the determining of the braking hydraulic pressure, and the controlling of the braking hydraulic pressure are sequentially performed.

In the determining of whether the posture of the vehicle is in the unstable state, when it is confirmed that the excessive or insufficient yaw rate occurs compared to the driver's will to steer together with the confirmation of the turning traveling of the vehicle and the braking state during the turning traveling, it is determined that the posture of the vehicle is unstable.

Alternatively, in the determining of whether the posture of the vehicle is in the unstable state, when it is confirmed that an unintended yaw rate occurs upon straight traveling of the vehicle or upon the braking during the straight traveling, it is determined that the posture of the vehicle is unstable.

Alternatively, in the determining of whether the posture of the vehicle is in the unstable state, when it is confirmed that a wheel velocity difference is equal to or greater than a reference value compared to the vehicle velocity upon straight traveling of the vehicle or upon the braking during the straight traveling, it is determined that the posture of the vehicle is unstable.

In another exemplary embodiment of the present invention, the determining of the regenerative braking execution amount and the execution hydraulic braking torque includes: determining the total braking torque for satisfying a driver demand braking torque; and determining the execution hydraulic braking torque by subtracting the regenerative braking execution amount from the total braking torque.

Through the above configuration, various aspects of the present invention provide the following effects.

First, it is possible to predict the friction coefficient of the brake pad according to the traveling situation in real time using the wheel velocity, the disc temperature, and the braking hydraulic pressure, to determine the target braking torque determined using the predicted friction coefficient, and then to allow the determined target braking torque to be reflected to the real braking torque through the feedforward control, upon the hydraulic braking control for securing the traveling stability of the vehicle, improving the accuracy and response speed of the braking control.

Second, it is possible to predict the friction coefficient of the brake pad according to the traveling situation in real time using the wheel velocity, the disc temperature, and the braking hydraulic pressure, to determine the execution hydraulic braking torque determined using the predicted friction coefficient, and then to allow the determined execution hydraulic braking torque to be reflected to the real braking torque through the feedforward control, upon the cooperative control between the regenerative braking and the hydraulic braking for securing the traveling stability of the vehicle, improving the distribution control accuracy of the regenerative braking amount and the hydraulic braking amount and the response velocity.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
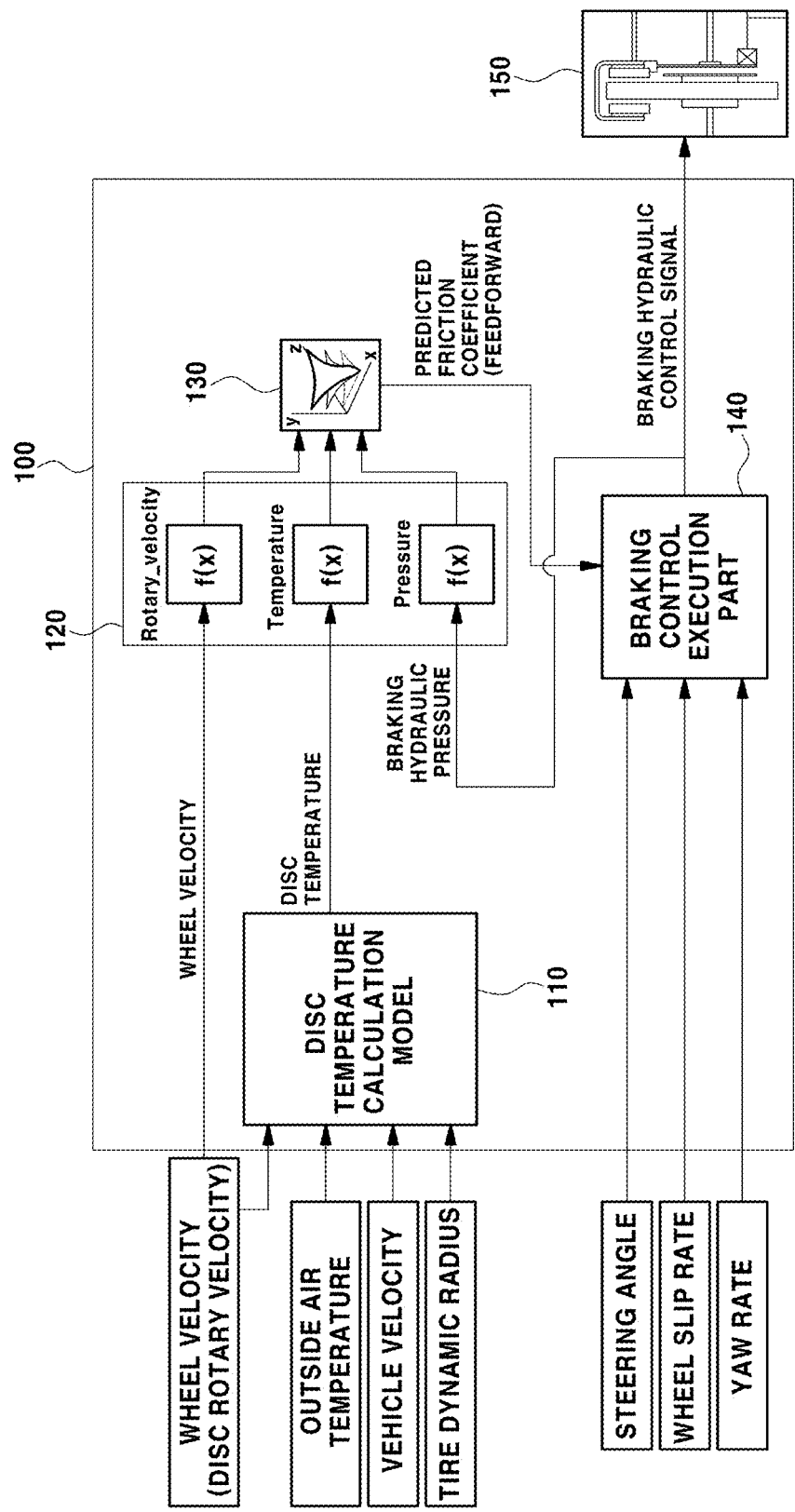
FIG. 1 is a control schematic diagram for a braking control method using a predicted friction coefficient of a brake pad in a braking apparatus according to various exemplary embodiments of the present invention.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in section by the particular intended application and use environment.

In the figures, reference numbers refer to the same or equivalent sections of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiments of the present invention will be described in detail with reference to the accompanying drawings, and specific structural and functional descriptions included in the following exemplary embodiment are merely illustrative for explaining the exemplary embodiment according to the concept of the present invention, and the exemplary embodiments according to the concept of the present invention may be embodied in various forms, and furthermore, may not be interpreted as being limited to the exemplary embodiments described In various exemplary embodiments of the present invention, and may be understood as including all changes, equivalents, and substitutions included in the spirit and technical range of the present invention.

Upon a hydraulic braking control for securing the traveling stability of a vehicle or a cooperative control of the regenerative braking and the hydraulic braking, a friction coefficient of a brake pad included in a braking apparatus of a vehicle is continuously or nonlinearly changed according to the temperature of a brake disc, a rotation velocity of the brake disc according to a wheel velocity, the size of the braking hydraulic pressure applied to the brake disc from a wheel cylinder and the brake pad, and the like, and when the traveling posture of the vehicle is unstable, a real braking torque is out of a target braking torque, lowering the accuracy and responsiveness of the braking control due to the occurrence of the over braking or the under braking, or the like different from the driver's will to brake.

Therefore, an exemplary embodiments of the present invention includes predicting a friction coefficient of a brake pad according to a traveling situation in real time using a wheel velocity, a disc temperature, and a braking hydraulic pressure, determining a target braking torque determined using the predicted friction coefficient, and then allowing the determined target braking torque to be reflected to a real braking torque through a feedforward control, upon a hydraulic braking control for securing the traveling stability of the vehicle, improving the accuracy and response speed of the braking control.

Figure 2:
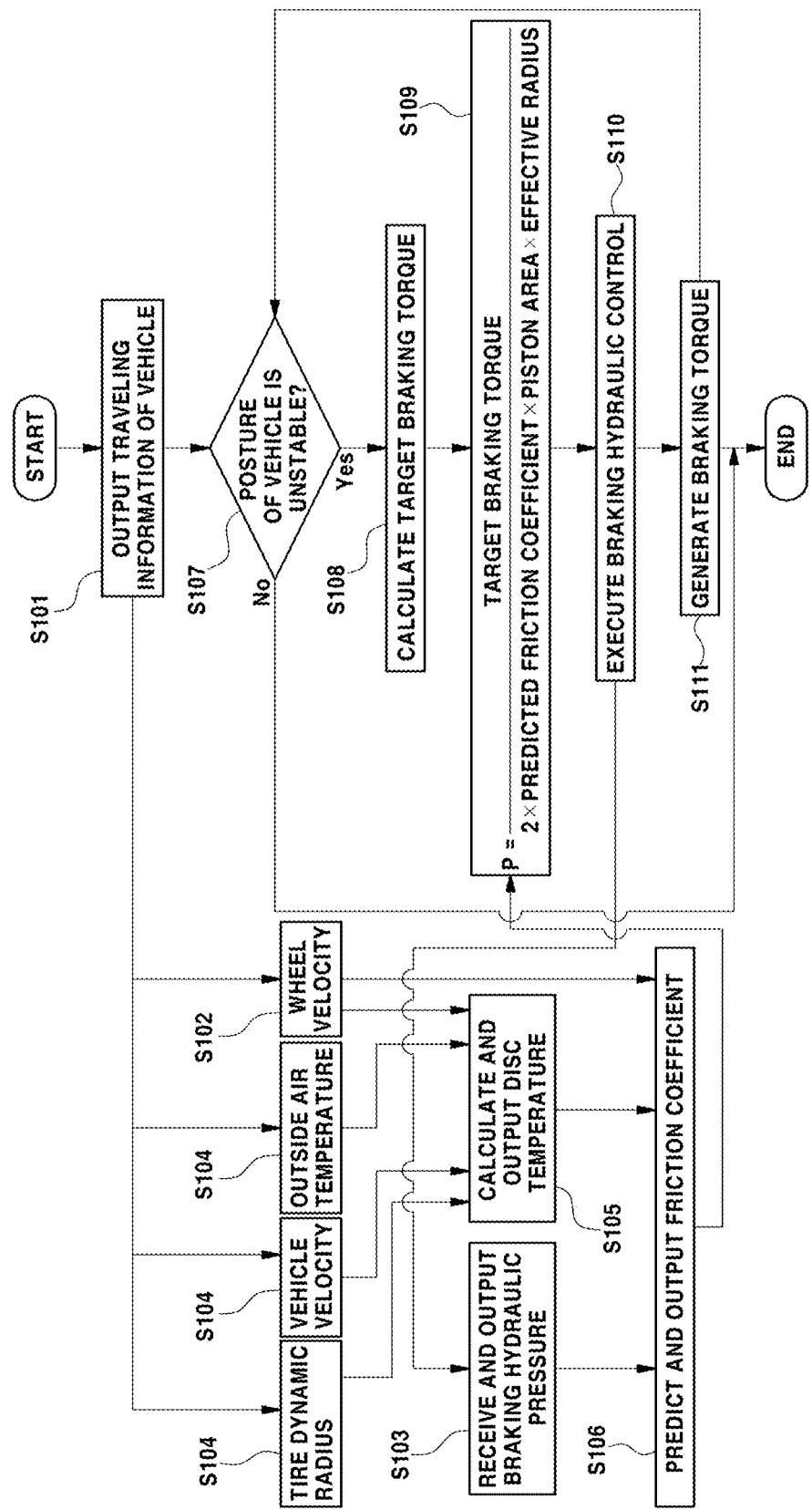
FIG. 2 is a flowchart illustrating the braking control method using the predicted friction coefficient of the brake pad according to various exemplary embodiments of the present invention.

FIG. 1 is a system schematic diagram for a braking control method using a predicted friction coefficient of a brake pad in a braking apparatus according to various exemplary embodiments of the present invention, and FIG. 2 is a flowchart illustrating the braking control method using the predicted friction coefficient of the brake pad according to various exemplary embodiments of the present invention.

As illustrated in FIG. 1, a braking controller 100 for a braking control according to various exemplary embodiments of the present invention include a disc temperature calculation model 110, a friction coefficient model 130 predicting and outputting a friction coefficient based on three or more input values of the rotation velocity, disc temperature, and braking hydraulic pressure of the brake disc input through the friction coefficient model input portion 120, a braking control logic portion 140 determining a target braking torque based on the friction coefficient output from the friction coefficient model 130 and applying a braking hydraulic control signal according to the target braking torque to a braking apparatus 150, and the like.

First, traveling information is output to a braking controller 100 while a vehicle travels (S101).

Therefore, a wheel velocity (=rotation velocity of the brake disc), an outside air temperature, a vehicle velocity, a tire dynamic radius, a steering angle, a wheel slip rate, a yaw rate, and the like detected by a wheel velocity sensor are input to the braking controller 100 as vehicle traveling information.

The wheel velocity is input to the friction coefficient model 130 through the friction coefficient model input portion 120 of the braking controller 100 as one of the control factors for predicting the friction coefficient (S102).

Furthermore, the braking hydraulic pressure is input to the friction coefficient model 130 through the friction coefficient model input portion 120 from the braking control logic portion 140 of the braking controller 100 upon the prior braking as another one of the control factors for predicting the friction coefficient (S103).

At the present time, the disc temperature may be input to the friction coefficient model 130 through the friction coefficient model input portion 120 as yet another one of the control factors for predicting the friction coefficient.

To the present end, the outside air temperature, the vehicle velocity, and the tire dynamic radius in addition to the wheel velocity are input to the disc temperature calculation model 110 for determining the disc temperature (S104).

Subsequently, when the disc temperature calculation model 110 determines and outputs the disc temperature, the determined disc temperature is input to the friction coefficient model 130 through the friction coefficient model input portion 120 (S105).

Here, a process in which the disc temperature calculation model 110 determines the disc temperature based on the outside air temperature, the vehicle velocity, the tire dynamic radius, and the like in addition to the wheel velocity will be referred to as follows.

Figure 4:
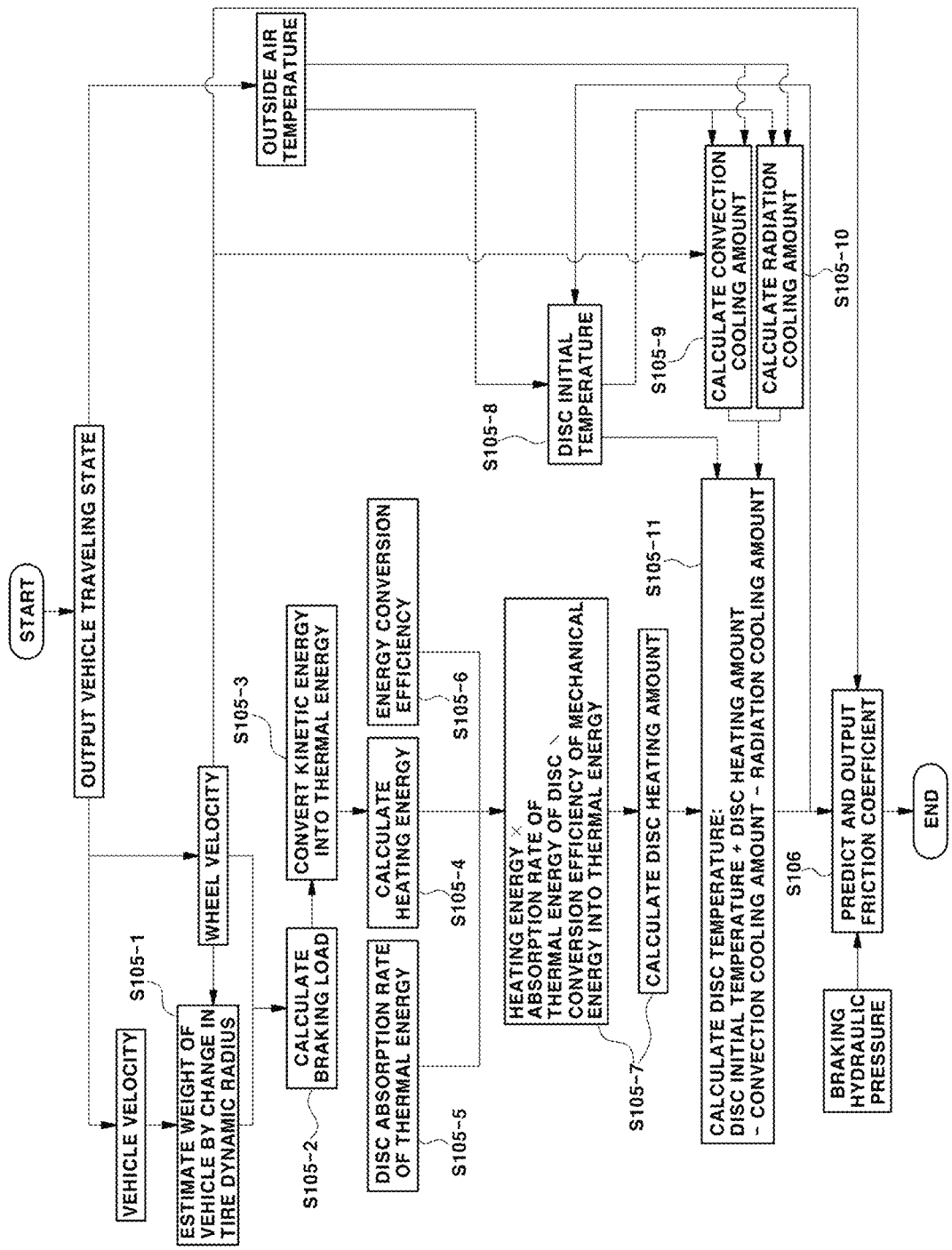
FIG. 4 is a flowchart illustrating a method for determining a disc temperature in a disc temperature model of a braking controller in the configuration for the braking control method according to various exemplary embodiments of the present invention.

FIG. 4 is a flowchart illustrating a method for determining the disc temperature in the disc temperature model of the braking controller in the configuration for the braking control method according to various exemplary embodiments of the present invention.

The wheel velocity input to the disc temperature calculation model 110 is information receivable from a wheel velocity sensor, and used to estimate the weight of the vehicle based on a change in the tire dynamic radius, and also used to determine a convection heat delivery coefficient according to the disc rotation velocity upon determination of the convection cooling amount of the disc.

The outside air temperature input to the disc temperature calculation model 110 is information receivable from an outside air temperature sensor, and used to determine the radiation cooling amount of the disc using a difference between the disc temperature and the outside air temperature.

The vehicle velocity input to the disc temperature calculation model 110 is information determined by detecting a change in the location with the time from a location-based sensor (e.g., Global Positioning System (GPS) sensor), and used to estimate the weight of the vehicle based on the change in the tire dynamic radius.

Therefore, the disc temperature calculation model 110 estimates the weight of the vehicle based on the change in the tire dynamic radius by comparing a value obtained by dividing the vehicle velocity by the tire dynamic radius with the wheel velocity as expressed in Equation 1 below (S105-1).

$$\text{Wheel velocity[rad/s]} = \text{vehicle velocity[kph]/dynamic radius[m]/3.6} \quad \text{Equation 1}$$

An initial tire dynamic radius sets the new vehicle tire state and pressure, and the dynamic radius of the empty vehicle weight condition as a basic value, and when the weight is increased by the passenger boarding, the cargo loading, or the like and thus the tire dynamic radius is smaller than the basic value, the wheel velocity (tire RPM) is faster than the same vehicle velocity such that the disc temperature calculation model 110 may estimate the axial weight of each wheel from the tire RPM change amount, and estimate the entire weight of the vehicle by summing the axial weight and the weight of the vehicle in the empty vehicle state.

The thus estimated weight of the vehicle is used to determine the disc heating temperature upon braking in the disc temperature calculation model 110.

Next, the disc temperature calculation model 110 determines a braking load (S105-2).

As expressed in Equation 2 below, the braking load may be obtained by summing the translational kinetic energy of the vehicle according to the vehicle velocity and the rotation kinetic energy by the rotation moment of inertia of the rotation body of a driving system.

$$E(t) = \tfrac{1}{2}mV(t)^2 + \tfrac{1}{2}I\theta(t)^2 \quad \text{Equation 2}$$

In Equation 2, $E(t)$ refers to the braking load, m refers to the weight of the vehicle, V refers to the vehicle velocity, I refers to the rotation moment of inertia, and $\theta$ refers to the angular velocity, respectively.

Subsequently, the kinetic energy according to the braking is converted into the same dimensional thermal energy parameter to determine the disc temperature change amount (S105-3).

The kinetic energy according to the braking may be expressed by Equation 3 below, and when the kinetic energy is converted into the same dimensional thermal energy parameter, this may be expressed by Equation 4 below.

$$E_{f1}(t) = E(t) \times \frac{B_f(t)}{B_f(t) + B_r(t)} \times \frac{1}{2} \quad \text{Equation 3}$$

In Equation 3, $E_{f1}(t)$ refers to the kinetic energy according to the braking, $E(t)$ refers to the braking load, the $B_f(t)$ refers to the front wheel brake force (kgf), and $B_r(t)$ refers to the rear wheel brake force (kgf), respectively.

$$E_{f1}(t) = Q_{f1}(t) \quad \text{Equation 4}$$

In Equation 4, $E_{f1}(t)$ refers to the kinetic energy according to the braking, and $Q_{f1}(t)$ refers to the same dimensional thermal energy, respectively.

Subsequently, the disc temperature increasing amount, that is, the heating energy is determined as the thermal energy is absorbed in the disc (S105-4).

The heating energy may be determined by Equation 5 below in which the density, specific heat, and volume parameters of the disc are reflected to the thermal energy in Equation 4.

$$\Delta T = \frac{Q_{f1}(t)}{\rho c v} \quad \text{Equation 5}$$

In Equation 5, $\Delta T$ refers to the heating energy, $\rho$ refers to the disc density, c refers to the disc specific heat, and v refers to the disc volume, respectively.

Furthermore, a thermal energy absorption rate of the brake disc, which is a rate at which the thermal energy is absorbed in the brake disc, that is, the rate at which the thermal energy generated by the friction between the brake disc and the brake pad is absorbed in the brake disc and the brake pad, is determined (S105-5).

The thermal energy absorption rate of the disc may be determined by Equation 6 below.

$$\gamma = \frac{q''_R}{q''_R + q''_P} = \frac{1}{1 + \left(\frac{\rho_P c_P k_P}{\rho_R c_R k_R}\right)^{\frac{1}{2}}} \quad \text{Equation 6}$$

In Equation 6, $\gamma$ refers to the thermal energy absorption rate of the brake disc, $q''_R$ refers to the HEAT FLUX (power/area) of the disc (ROTOR), $q''_p$ refers to the HEAT FLUX of the brake pad, $\rho_p$ refers to the density of the brake pad, $c_p$ refers to the specific heat of the brake pad, $k_p$ refers to the thermal conductivity of the brake pad, $\rho_R$ refers to the density of the disc (ROTOR), $c_R$ refers to the specific heat of the brake disc, and $k_R$ refers to the thermal conductivity of the brake disc, respectively.

At the present time, to reflect the loss when the kinetic energy according to the braking is converted into the same dimensional thermal energy parameter, the energy conversion efficiency (η) is set (S105-6).

Next, the disc heating amount is determined by multiplying the heating energy determined using Equation 5, the thermal energy absorption rate of the disc determined using Equation 6, and the energy conversion efficiency (S105-7).

Subsequently, the disc temperature is determined (S105-11).

The disc temperature may be determined as a value obtained by subtracting the convection cooling amount and the radiation cooling amount of the brake disc from the value of summing the disc initial temperature and the disc heating amount (disc temperature=disc initial temperature+disc heating amount−convection cooling amount−radiation cooling amount).

At the present time, the disc initial temperature may be determined as the outside air temperature received from the outside air temperature sensor (S105-8).

Furthermore, the convection cooling amount of the disc is a value obtained by determining the temperature decreasing amount of the brake disc by the convection, and determined by Equation 7 below in which parameters, such as the density of the brake disc, the specific heat of the brake disc, the volume of the brake disc, the outside air temperature, the cooling time, the convection heat delivery coefficient, and the convection operation area, are reflected (S105-9).

$$\Delta T = \frac{(h_1 A_1 + h_2 A_2 + h_3 A_3 + \ldots + h_6 A_6) \times (T(t) - T_\infty)}{\rho c v} \times t_{Cooling} \qquad \text{Equation 7}$$

ΔT refers to the convection cooling amount of the brake disc, ρ refers to the density of the brake disc, c refers to the specific heat of the brake disc, v refers to the volume of the brake disc, $t_{cooling}$ refers to the cooling time, T(t) refers to the surface temperature of the brake disc, $T_\infty$ refers to the outside air temperature, h refers to the convection heat delivery coefficient, and A refers to the convection operation area, respectively.

Furthermore, the radiation cooling amount of the disc is a value obtained by determining the temperature decreasing amount of the brake disc by the radiation, and determined by Equation 8 below in which parameters, such as the density of the brake disc, the specific heat of the brake disc, the volume of the brake disc, the outside air temperature, the cooling time, the emissivity, the Stefan Boltzmann constant, and the radiation operation area, are reflected (S105-10).

$$\Delta T = \varepsilon \times \sigma \times \frac{(AR_1 + AR_2 + AR_3) \times (T(t)^4 - T_\infty^4)}{\rho c v} \times t_{Cooling} \qquad \text{Equation 8}$$

ΔT refers to the radiation cooling amount of the brake disc, ρ refers to the density of the brake disc, c refers to the specific heat of the brake disc, v refers to the volume of the brake disc, $t_{cooling}$ refers to the cooling time, T(t) refers to the surface temperature of the brake disc, $T_\infty$ refers to the outside air temperature, ε refers to the emissivity, σ refers to the Stefan Boltzmann constant, and AR refers to the radiation operation area, respectively.

Therefore, the disc temperature finally determined by the disc temperature calculation model 110 through the step S105-11 is input to the friction coefficient model 130.

As described above, when a step S102 in which the wheel velocity, which is one of the control factors for predicting the friction coefficient, is input to the friction coefficient model 130, a step S103 in which the braking hydraulic pressure, which is another one of the control factors for predicting the friction coefficient, is input to the friction coefficient model 130, and a step S105 in which the disc temperature as yet another one of the control factors for predicting the friction coefficient is determined by the disc temperature calculation model 110 and then input to the friction coefficient model 130, are completed, the friction coefficient model 130 predicts and outputs the friction coefficient (S106).

The friction coefficient model 130 is configured to predict one friction coefficient matching with the wheel velocity (rotation velocity of the disc), the disc temperature, and the braking hydraulic pressure (pressure applied to the disc) to output the predicted friction coefficient to the braking control logic portion 140.

Figure 5:
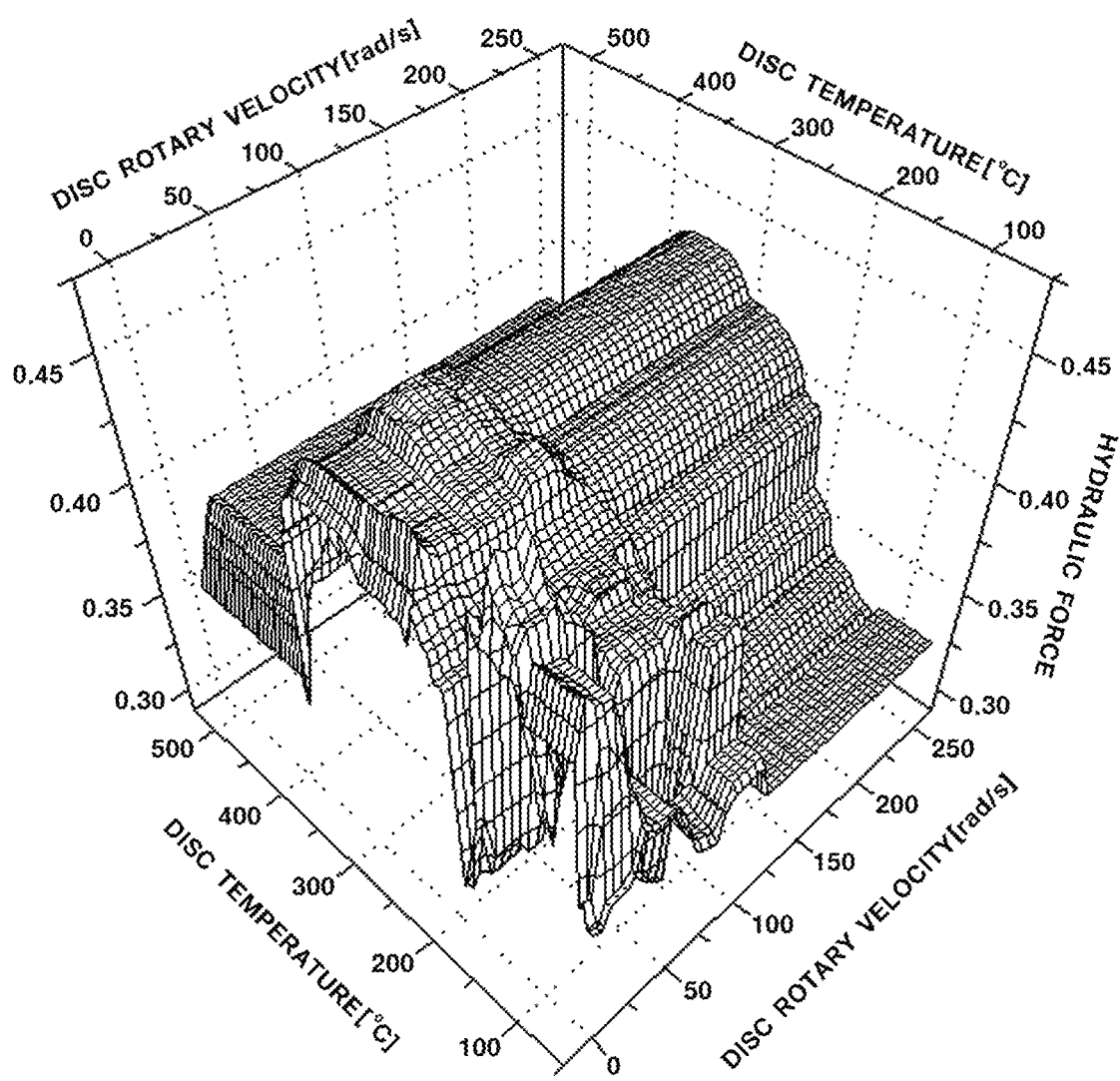
FIG. 5 is a diagram illustrating a friction coefficient output from a friction coefficient model of the braking controller as a three-dimensional graph in the configuration for the braking control method according to various exemplary embodiments of the present invention.

For example, as illustrated in FIG. 5 illustrating the output exemplary graph of the friction coefficient model, the friction coefficient model 130 predicts one friction coefficient matching with the wheel velocity (rotation velocity of the disc), the disc temperature, and the braking hydraulic pressure (pressure applied to the disc) to output the predicted friction coefficient to the braking control logic portion 140.

The friction coefficient model 130 may be provided in a form of a memory chip for each specification of the braking apparatus of each vehicle type and mounted on the braking controller 100 to be replaceable.

At the present time, the friction coefficient predicted by the friction coefficient model 130 is output to the braking control logic portion 140 in the feedforward method.

Next, the braking control logic portion 140 determines a target braking torque (S108), and determines a braking hydraulic pressure configured for generating the determined target braking torque (S109).

At the present time, the braking hydraulic pressure (P) configured for generating the target braking torque is determined by Equation 9 below in which the friction coefficient output from the friction coefficient model 130 is reflected.

$$P = \text{target braking torque} / 2 \times \text{predicted friction coefficient} \times \text{piston area} = \text{effective radius} \qquad \text{Equation 9}$$

In Equation 9, P refers to the braking hydraulic pressure, the piston area refers to the piston area of the wheel cylinder pressing the brake pad, and the effective radius refers to the effective radius of the disc which is in friction contact with the brake pad.

In an exemplary embodiment of the present invention, the effective radius refers to a shortest distance from a rotation axis of a disc in a brake caliper to a point where the brake force is applied to the disc by the brake caliper piston of the brake caliper, such as a center of the brake caliper piston, in the brake caliper.

Subsequently, the braking hydraulic control applying the braking hydraulic pressure determined by Equation 9 to the braking apparatus is executed by the braking control logic portion 140 (S110).

The real time update, in which a braking hydraulic signal applied to the braking apparatus is input to the friction coefficient model 130 through the friction coefficient model input portion 120, is performed by the braking control logic portion 140.

Subsequently, by applying the braking hydraulic pressure determined by Equation 9 to the braking apparatus (e.g., wheel cylinder), the braking torque according to the friction contact between the brake pad and the disc is generated for the substantial braking (S111).

Meanwhile, the braking control intervention, such as the step of determining the target braking torque (S108), the step of determining the braking hydraulic pressure configured for generating the determined target braking torque (S109), and the step of executing the braking hydraulic control (S110), is preferably performed for securing the traveling stability of the vehicle in the braking control logic portion 140, when it is determined that the posture of the vehicle is in the unstable state.

Therefore, the braking control logic portion 140 determines whether the posture of the vehicle is in the unstable state (S107) prior to the step of determining the target braking torque (S108).

To the present end, the steering angle, the wheel slip rate, and the yaw rate among the vehicle traveling information are input to the braking control logic portion 140 in the braking situation to determine whether the posture of the vehicle is in the unstable state.

As an example of the step of determining whether the posture of the vehicle is in the unstable state (S107), when it is confirmed that the excessive or insufficient yaw rate is generated compared to the driver's will to steer together with the confirmation of the turning traveling based on the steering angle and the braking state during the turning traveling, it is determined that the posture of the vehicle is unstable, the braking control intervention such as the steps S108 to S110 may be performed to secure the traveling stability of the vehicle.

For example, the posture of the vehicle may be controlled in the direction in which the yaw rate is not excessive by generating the braking torque in the turning opposite direction when the yaw rate is excessively generated, or the posture of the vehicle may be controlled in the direction in which the yaw rate is not insufficient by generating the braking torque in the turning direction when the yaw rate is insufficiently generated.

As another example of the step of determining whether the posture of the vehicle is in the unstable state (S107), when it is confirmed that the unintended yaw rate is generated upon straight traveling of the vehicle or upon the braking during the straight traveling, it is determined that the posture of the vehicle is unstable such that the braking control intervention such as the steps S108 to S110 may be performed to secure the traveling stability of the vehicle.

For example, when the unintended yaw rate is generated upon the straight traveling, the posture of the vehicle may be controlled such that the vehicle may straightly travel without the generate of the yaw rate by generating the braking torque in the opposite direction in which the yaw rate is generated.

As yet another example of the step of determining whether the posture of the vehicle is in the unstable state (S107), when it is confirmed that the wheel velocity difference occurs by a reference value or more compared to the vehicle velocity upon straight traveling of the vehicle or upon the braking during the straight traveling, it is determined that the posture of the vehicle is unstable such that the braking control intervention such as the steps S108 to S110 may be performed to secure the traveling stability of the vehicle.

For example, if the vehicle velocity is relatively smaller than the wheel velocity, it is determined as the unstable situation where the wheel spin occurs to generate the braking torque, suppressing the wheel spin, and the braking control of applying the braking torque may be also performed in the wheel slip rate region where the wheel-road surface gripping force is maximized.

As described above, the braking control intervention, such as the step of determining the target braking torque in the braking control logic portion 140 when it is determined that the posture of the vehicle is in the unstable state during the traveling of the vehicle and upon the braking (S108), the step of determining the braking hydraulic pressure configured for generating the determined target braking torque (S109), and the step of executing the braking hydraulic control (S110), may be performed, largely improving the responsiveness and accuracy of the braking control.

Meanwhile, as the accurate braking torque may not be conventionally obtained by not reflecting the change in the friction coefficient of the brake pad changed according to the traveling situation, a change in the braking torque according to the friction coefficient may be caused.

Figure 9:
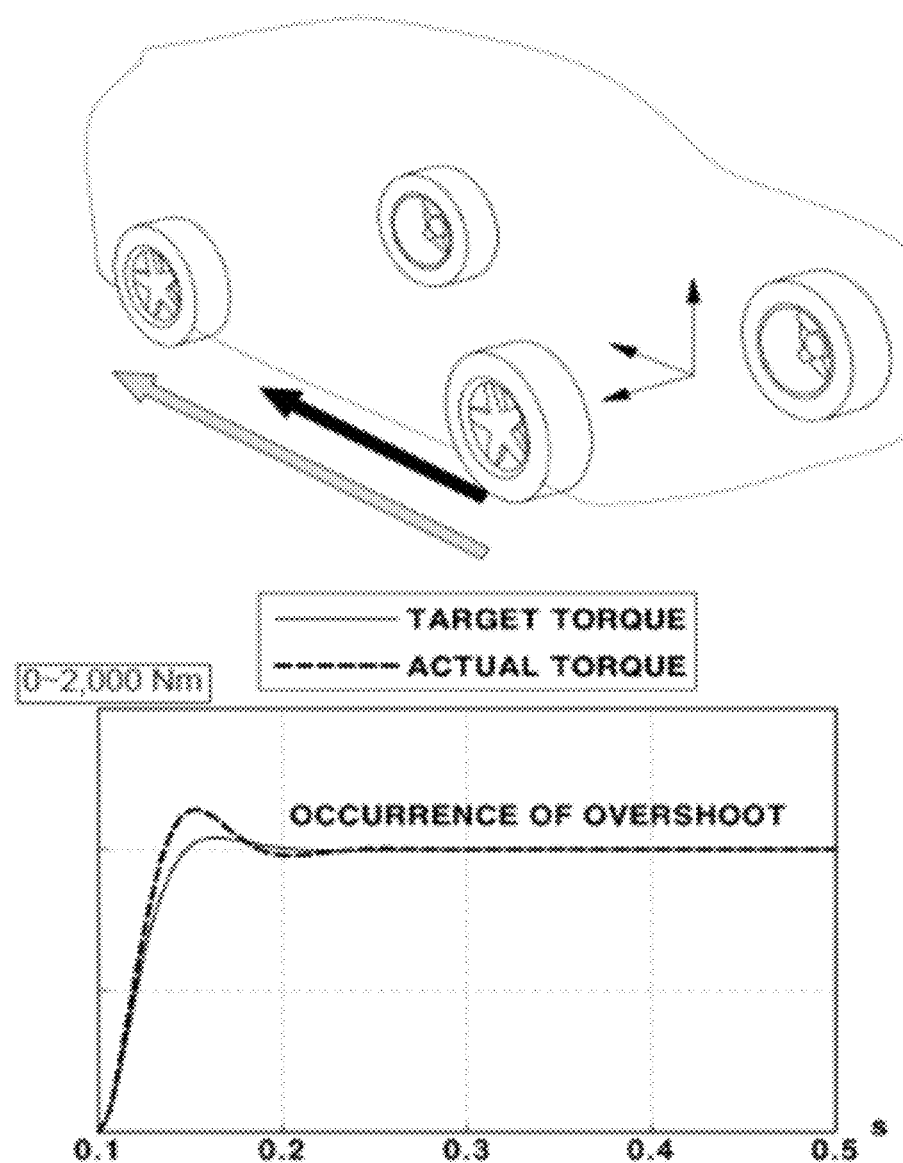
FIG. 9 and FIG. 10 are diagrams illustrating a phenomenon in which a real braking torque of a vehicle is out of a target braking torque.

Therefore, as illustrated in FIG. 9, if the real friction coefficient is greater than a fixed or map friction coefficient, there may occur an overshoot phenomenon in which the real braking torque is greater than the target braking torque.

Figure 10:
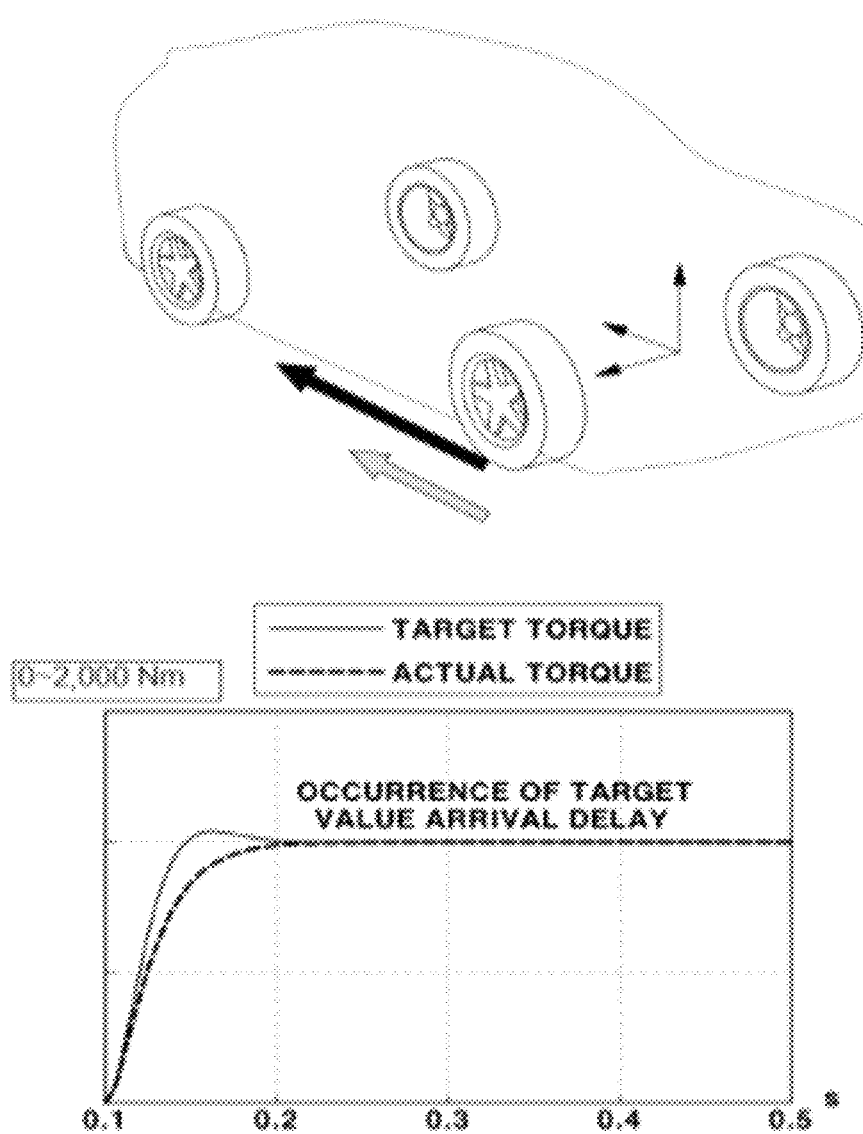

Alternatively, as illustrated in FIG. 10, if the real friction coefficient is smaller than the fixed or map friction coefficient, there may occur a target braking torque arrival delay phenomenon in which the real braking torque is smaller than the target braking torque.

Figure 11:
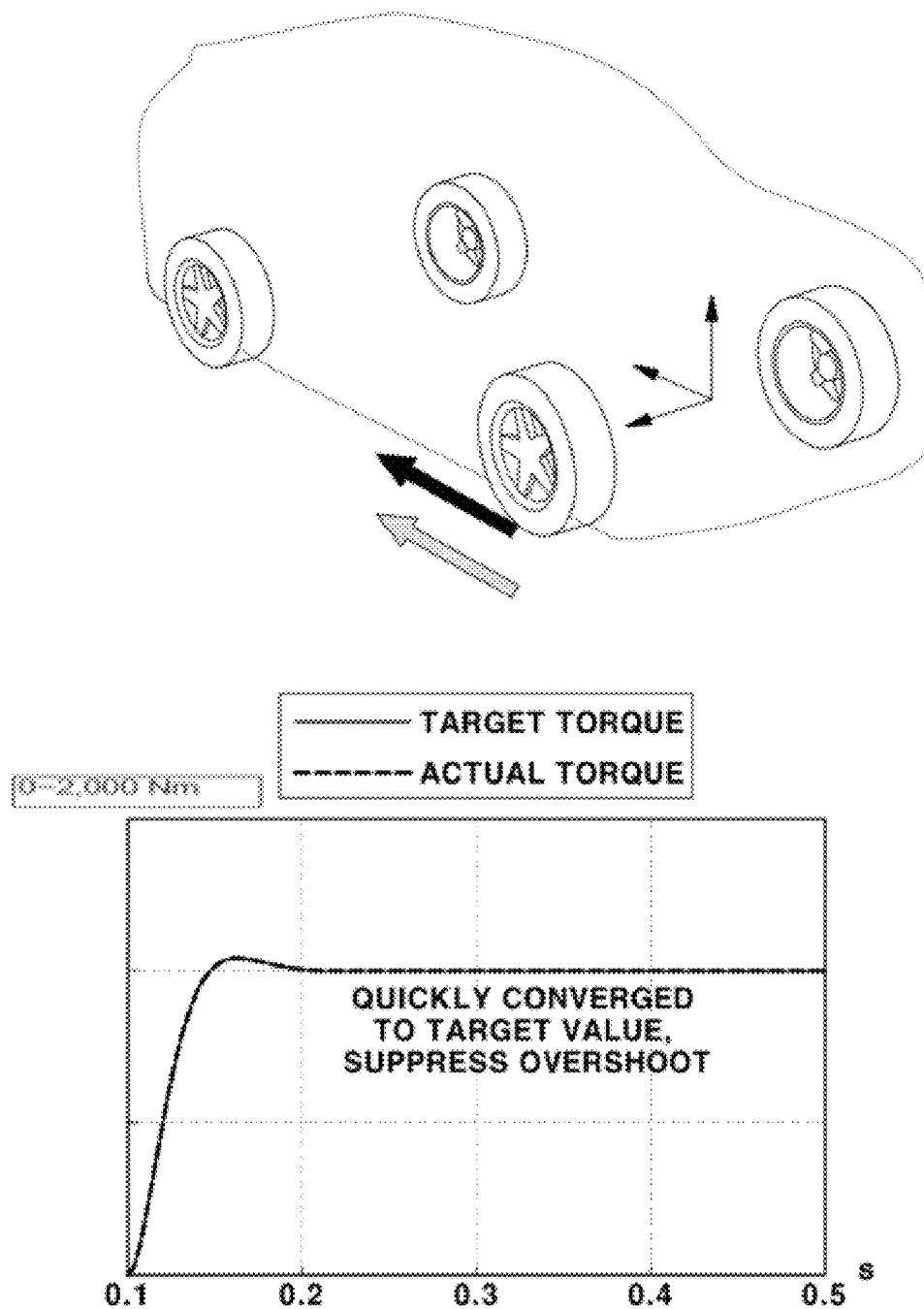
FIG. 11 is a diagram illustrating that the real braking torque of the vehicle matches with the target braking torque by the braking control method according to various exemplary embodiments of the present invention.

Unlike the above, as described above, by predicting the friction coefficient of the brake pad according to the traveling situation in real time using the wheel velocity, the disc temperature, and the braking hydraulic pressure, determining the target braking torque determined using the predicted friction coefficient, and then allowing the determined target braking torque to be reflected to the real braking torque, as illustrated in FIG. 11, the real braking torque may be accurately converged to the target braking torque, improving the accuracy and response speed of the braking control.

Here, the braking control method according to various exemplary embodiments of the present invention will be described.

To help to understand another exemplary embodiment of the present invention, an example of not satisfying the driver demand braking torque upon the cooperative control between the regenerative braking and the hydraulic braking will be described with reference to FIG. 6 and FIG. 7 as follows.

The total braking amount of the eco-friendly vehicle such as a hybrid electric vehicle or an electric vehicle is determined by the sum of the regenerative braking torque according to the regenerative braking execution amount of the motor and the hydraulic braking torque according to the operation of the braking apparatus, and the hydraulic braking torque is determined by the hydraulic generation amount, the brake specifications, and the friction coefficient of the brake pad.

Figure 6:
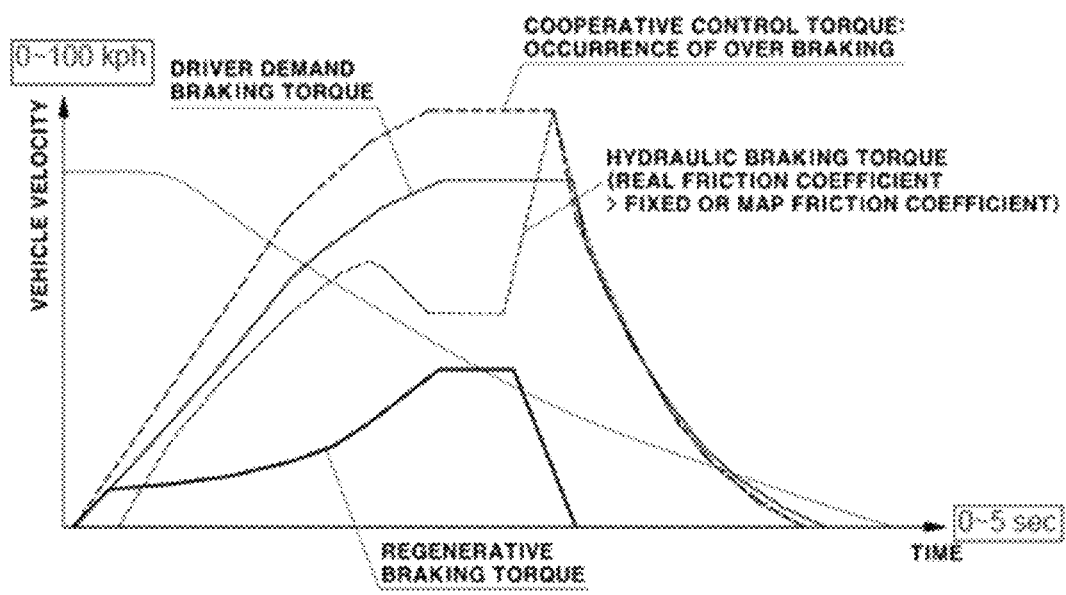
FIG. 6 and FIG. 7 are braking control line diagrams illustrating an example of not satisfying a driver demand braking torque, upon a cooperative control between the regenerative braking and the hydraulic braking.
Figure 7:
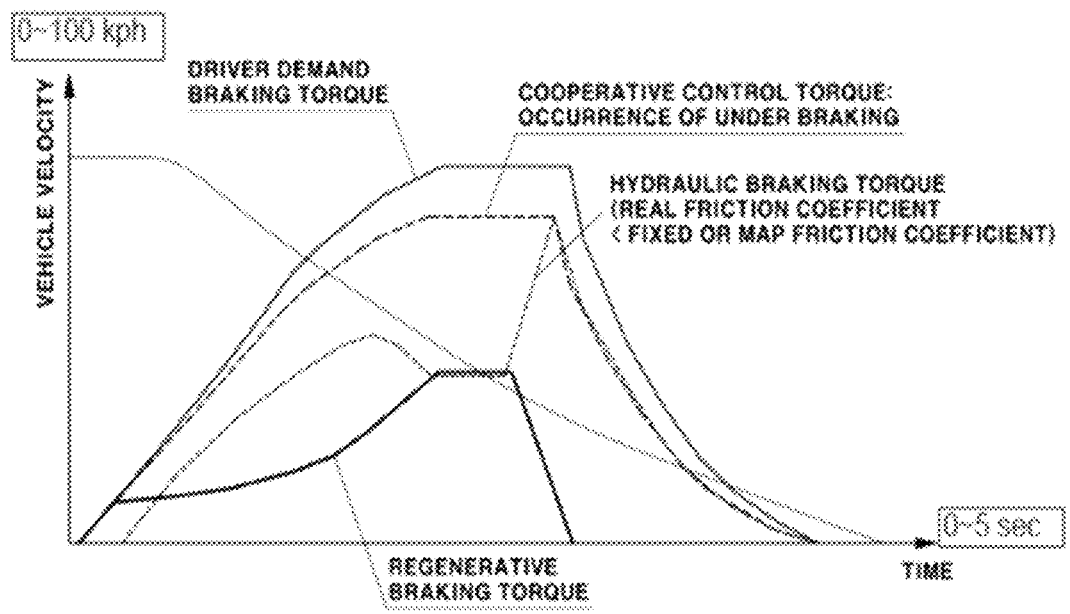

As illustrated in FIG. 6, when the real friction coefficient according to the traveling situation is greater than the friction coefficient fixed value or the map friction coefficient which is preset in the braking controller, the target braking torque is controlled by reflecting the friction coefficient fixed value or the map friction coefficient, but there occurs the over braking phenomenon in which the real hydraulic braking torque is generated greater than the target braking torque, exerting the excessive braking force compared to the driver demand braking torque.

On the other hand, when the rear friction coefficient according to the traveling situation is smaller than the friction coefficient fixed value or the map friction coefficient which is preset in the braking controller, the target braking torque is controlled by reflecting the friction coefficient fixed value or the map friction coefficient, but there occurs the under braking phenomenon in which the real hydraulic braking torque is generated smaller than the target braking torque, exerting the insufficient braking force compared to the driver demand braking torque.

Therefore, another exemplary embodiment of the present invention includes predicting the friction coefficient of the brake pad according to the traveling situation in real time using the wheel velocity, the disc temperature, and the braking hydraulic pressure, determining the execution hydraulic braking torque determined using the predicted friction coefficient, and then allowing the determined execution hydraulic braking torque to be reflected to the real braking torque through the feedforward control, upon the cooperative control between the regenerative braking and the hydraulic braking for securing the traveling stability of the vehicle, improving the distribution control accuracy of the regenerative braking amount and the hydraulic braking amount and the response velocity.

Figure 3:
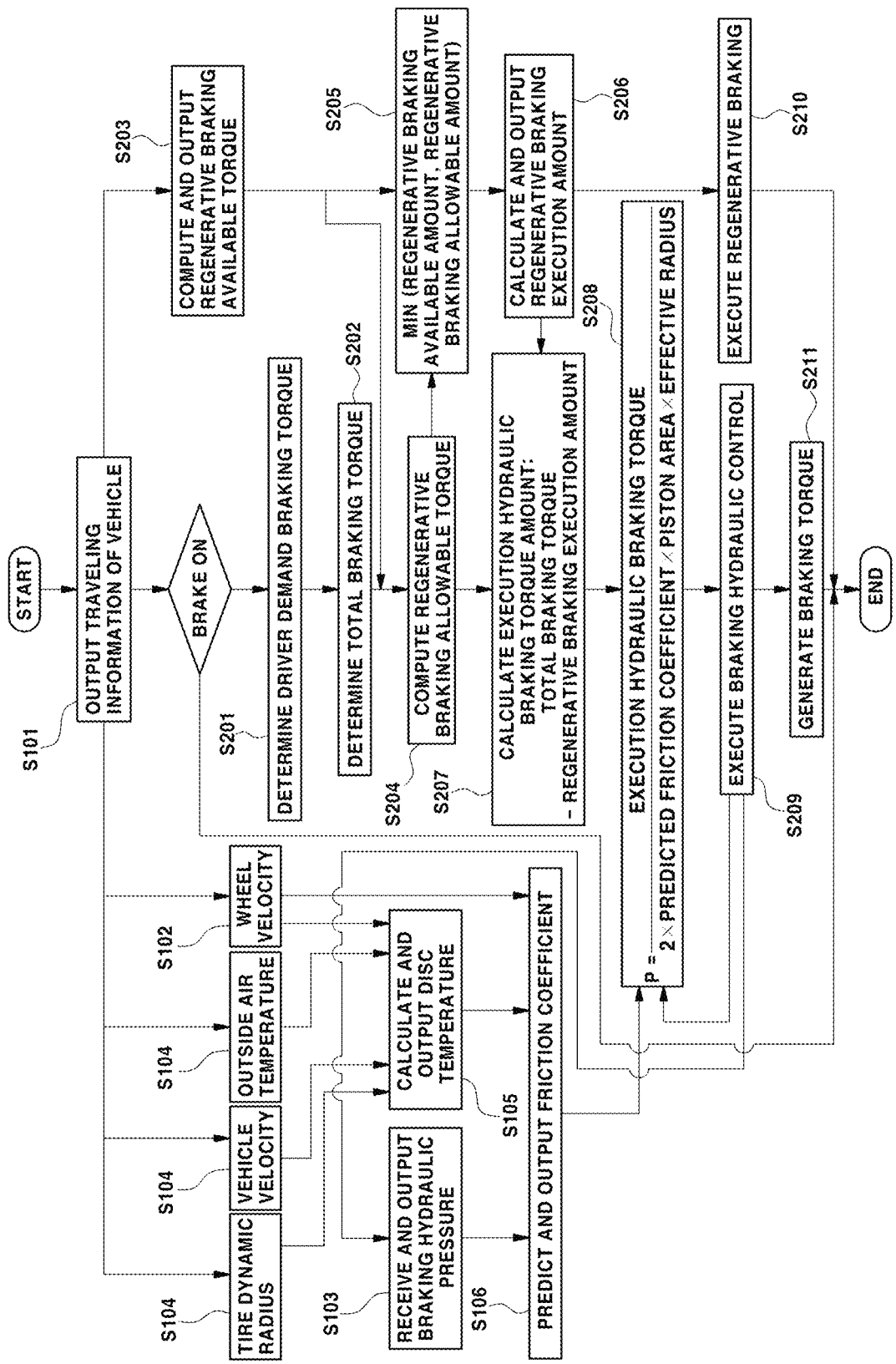
FIG. 3 is a flowchart illustrating a braking control method using a predicted friction coefficient of a brake pad in a braking apparatus according to various exemplary embodiments of the present invention.

FIG. 3 is a flowchart illustrating the braking control method using the predicted friction coefficient of the brake pad according to various exemplary embodiments of the present invention.

First, the traveling information during the traveling of the vehicle is output to the braking controller 100 (S101).

Therefore, the wheel velocity (=rotation velocity of the brake disc), the outside air temperature, the vehicle velocity, the tire dynamic radius, the steering angle, the wheel slip rate, the yaw rate, and the like detected by a wheel velocity sensor are input to the braking controller 100 as the vehicle traveling information.

The wheel velocity is input to the friction coefficient model 130 through the friction coefficient model input portion 120 of the braking controller 100 as one of the control factors for predicting the friction coefficient (S102).

Furthermore, the braking hydraulic pressure is input to the friction coefficient model 130 through the friction coefficient model input portion 120 from the braking control logic portion 140 of the braking controller 100 upon the prior braking as another one of the control factors for predicting the friction coefficient (S103).

At the present time, the disc temperature may be input to the friction coefficient model 130 through the friction coefficient model input portion 120 as yet another one of the control factors for predicting the friction coefficient.

To the present end, the outside air temperature, the vehicle velocity, and the tire dynamic radius in addition to the wheel velocity are input to the disc temperature calculation model 110 for determining the disc temperature (S104).

Subsequently, when the disc temperature determined by the disc temperature calculation model 110 through the steps S105-1 to S105-11 is output, the determined disc temperature is input to the friction coefficient model 130 through the friction coefficient model input portion 120 (S105).

As described above, even in the another exemplary embodiment of the present invention, when the step of inputting the wheel velocity, which is one of the control factors for predicting the friction coefficient, to the friction coefficient model 130 (S102), the step of inputting the braking hydraulic pressure, which is another one of the control factors for predicting the friction coefficient, to the friction coefficient model 130 (S103), and the step of determining the disc temperature in the disc temperature calculation model 110 and then inputting the determined disc temperature to the friction coefficient model 130 as yet another one of the control factors for predicting the friction coefficient (S105) are completed, as described above, the friction coefficient model 130 predicts and outputs the friction coefficient (S106).

Meanwhile, when the brake is in the ON state by depressing a brake pedal, the braking controller 100 determines the driver demand braking torque according to the depressed amount of the brake pedal (S201), and determines the total braking torque for satisfying the driver demand braking torque (S202).

At the present time, a hybrid control unit (HCU), which is the highest level controller of the eco-friendly vehicle such as a hybrid electric vehicle or an electric vehicle, determines the regenerative braking available torque by the motor and outputs the regenerative braking available torque to the braking controller 100 (S203).

Subsequently, the braking controller 100 determines the regenerative braking allowable torque within the regenerative braking available torque received from the hybrid controller to output the regenerative braking allowable torque to the hybrid controller (S204).

Subsequently, the hybrid controller compares the regenerative braking available amount (available torque) to the regenerative braking allowable amount (allowable torque) (S205), and determines a smaller value as the comparison result as a regenerative braking execution amount (execution torque) to output the regenerative braking execution amount to the braking controller (S206).

Subsequently, the braking controller is configured to determine the execution hydraulic braking torque (S207).

That is, the braking controller subtracts the regenerative braking execution amount from the total braking torque to determine the execution hydraulic braking torque.

Next, the braking control logic portion 140 of the braking controller is configured to determine the braking hydraulic pressure configured for generating the execution hydraulic braking torque (S208).

At the present time, the braking hydraulic pressure (P) configured for generating the execution hydraulic braking torque is determined by Equation 10 below in which the friction coefficient output from the friction coefficient model 130 as described above is reflected.

$$P = \text{execution hydraulic braking torque}/(2 \times \text{predicted friction coefficient} \times \text{piston area} \times \text{effective radius}) \quad \text{Equation 10}$$

In Equation 10, P refers to the braking hydraulic pressure, the piston area refers to the piston area of the wheel cylinder pressing the brake pad, and the effective radius refers to the effective radius of the disc which is in friction contact with the brake pad.

Subsequently, the braking control logic portion 140 executes the braking hydraulic control applying the braking hydraulic pressure determined by Equation 10 to the braking apparatus (S209).

The real time update, in which a braking hydraulic signal applied to the braking apparatus is input to the friction coefficient model 130 through the friction coefficient model input portion 120, is performed by the braking control logic portion 140.

Subsequently, by applying the braking hydraulic pressure determined by Equation 10 to the braking apparatus (e.g., wheel cylinder), the braking torque according to the friction contact between the brake pad and the disc is generated for the substantial braking (S211).

At the same time, when the hybrid controller outputs the regenerative braking execution amount to the motor controller, the regenerative braking of the motor is performed by the control of the motor controller (S210).

Figure 8:
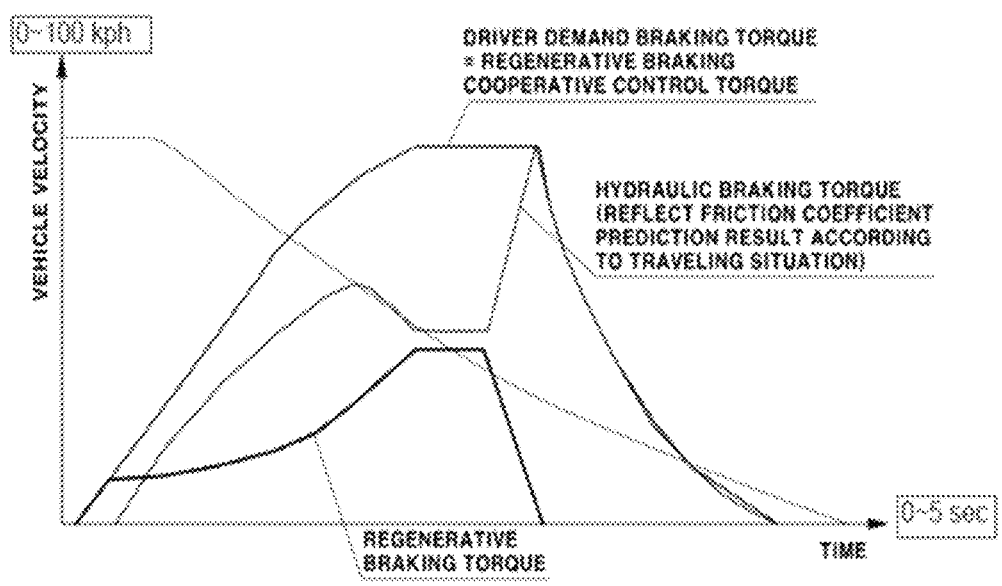
FIG. 8 is a braking control line diagram illustrating an example of satisfying the driver demand braking torque by the braking control method according to various exemplary embodiments of the present invention, upon the cooperative control between the regenerative braking and the hydraulic braking.

As described above, by predicting the friction coefficient of the brake pad according to the traveling situation in real time using the wheel velocity, the disc temperature, and the braking hydraulic pressure, determining the execution hydraulic braking torque determined using the predicted friction coefficient, and then allowing the determined execution hydraulic braking torque to be reflected to the real braking torque through the feedforward control, upon the cooperative control between the regenerative braking and the hydraulic braking, as illustrated in FIG. 8, the execution hydraulic braking torque may be accurately converged to the target braking torque, improving the distribution control accuracy of the regenerative braking amount and the hydraulic braking amount and the response velocity.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A braking control method using a friction coefficient of a brake pad in a braking apparatus including a brake disc, the braking control method comprising:
    predicting, by a controller, the friction coefficient of the brake pad changed according to a traveling situation of a vehicle;
    determining, by the controller, a target braking torque for hydraulic braking;
    determining, by the controller, a braking hydraulic pressure configured for generating the target braking torque using the predicted friction coefficient and the determined target braking torque; and
    controlling, by the controller, the braking hydraulic pressure which applies the determined braking hydraulic pressure to the braking apparatus,
    wherein the predicting of the friction coefficient includes:
        determining a disc temperature of the brake disc using vehicle traveling information in a disc temperature calculation model,
    wherein the determining of the disc temperature includes:
        estimating a weight of the vehicle according to a change in a tire dynamic radius;
        determining a braking load;
        determining heating energy, which is a disc temperature increasing amount, and a thermal energy absorption rate of the brake disc, which is a rate at which thermal energy is absorbed to the brake disc and the brake pad, after converting kinetic energy according to the braking into a thermal energy parameter;
        determining a disc heating amount by multiplying the heating energy, the thermal energy absorption rate of the brake disc, and an energy conversion efficiency for reflecting a loss when the kinetic energy according to the braking is converted into the thermal energy parameter; and
        determining a disc temperature by subtracting a convection cooling amount and a radiation cooling amount of the brake disc from a value obtained by summing the disc heating amount and a disc initial temperature.

2. The braking control method of claim 1, wherein the predicting of the friction coefficient further includes:

receiving, by the controller, a wheel velocity, the braking hydraulic pressure, and the disc temperature determined by the disc temperature calculation model among the vehicle traveling information in a friction coefficient model of the controller; and predicting and outputting, by the controller, the friction coefficient in the friction coefficient model according to the wheel velocity, the disc temperature, and the braking hydraulic pressure.

3. The braking control method of claim 2,
wherein the friction coefficient model is configured to predict one friction coefficient matching with the wheel velocity, the disc temperature, and the braking hydraulic pressure to output the predicted friction coefficient to a braking control logic portion of the controller, wherein the braking control logic portion is engaged to the friction coefficient model.

4. The braking control method of claim 1, wherein the disc initial temperature is an outside air temperature.

5. The braking control method of claim 1, further including:
inputting a braking hydraulic signal applied to the braking apparatus to the friction coefficient model through a friction coefficient model input portion of the controller, wherein the friction coefficient model input portion is engaged to the friction coefficient model.

6. The braking control method of claim 1, further including:
determining, by the controller, whether a posture of the vehicle is in an unstable state prior to the determining of the target braking torque,
wherein when the controller determines that the posture of the vehicle is unstable, the determining of the target braking torque, the determining of the braking hydraulic pressure, and the controlling of the braking hydraulic pressure are sequentially performed.

7. The braking control method of claim 6,
wherein in the determining of whether the posture of the vehicle is in the unstable state,
the controller concludes that the posture of the vehicle is unstable, when the controller determines that an excessive or insufficient yaw rate occurs compared to a driver's will to steer with confirmation of turning traveling of the vehicle and a braking state during the turning traveling.

8. The braking control method of claim 6,
wherein in the determining of whether the posture of the vehicle is in the unstable state,
the controller concludes-that that the posture of the vehicle is unstable, when the controller determines that an unintended yaw rate occurs upon straight traveling of the vehicle or upon the braking during the straight traveling.

9. The braking control method of claim 6,
wherein in the determining of whether the posture of the vehicle is in the unstable state,
the controller concludes that-that the posture of the vehicle is unstable, when the controller determines that a wheel velocity difference is equal to or greater than a reference value compared to a vehicle velocity upon straight traveling of the vehicle or upon the braking during the straight traveling.

10. The braking control method of claim 1, wherein the controller includes:
a processor; and a non-transitory storage medium on which a program for performing the braking control method of claim 1 is recorded and executed by the processor.

11. A braking control method using a friction coefficient of a brake pad in a braking apparatus including a brake disc, the braking control method comprising:
predicting, by a controller, the friction coefficient of the brake pad changed according to a traveling situation of a vehicle;
determining, by the controller, a regenerative braking execution amount and an execution hydraulic braking torque for a cooperative control of a regenerative braking and a hydraulic braking of the vehicle;
determining, by the controller, a braking hydraulic pressure configured for generating the execution hydraulic braking torque using the predicted friction coefficient and the determined execution hydraulic braking torque; and
controlling, by the controller, the braking hydraulic pressure which applies the determined braking hydraulic pressure to the braking apparatus,
wherein the predicting of the friction coefficient includes:
determining, by the controller, a disc temperature of the brake disc using vehicle traveling information in a disc temperature calculation model,
wherein the determining of the disc temperature includes:
estimating a weight of the vehicle according to a change in a tire dynamic radius;
determining a braking load;
determining heating energy, which is a disc temperature increasing amount, and a thermal energy absorption rate of the brake disc, which is a rate at which thermal energy is absorbed to the brake disc and the brake pad, after converting kinetic energy according to the braking into a thermal energy parameter;
determining a disc heating amount by multiplying the heating energy, the thermal energy absorption rate of the brake disc, and an energy conversion efficiency for reflecting a loss when the kinetic energy according to the braking is converted into the thermal energy parameter; and
determining a disc temperature by subtracting a convection cooling amount and a radiation cooling amount of the brake disc from a value obtained by summing the disc heating amount and a disc initial temperature.

12. The braking control method of claim 11, wherein the predicting of the friction coefficient further includes:
receiving, by the controller, a wheel velocity, the braking hydraulic pressure, and the disc temperature determined by the disc temperature calculation model among the vehicle traveling information in a friction coefficient model of the controller; and
predicting and outputting, by the controller, the friction coefficient in the friction coefficient model according to the wheel velocity, the disc temperature, and the braking hydraulic pressure.

13. The braking control method of claim 12,
wherein the friction coefficient model is configured to predict one friction coefficient matching with the wheel velocity, the disc temperature, and the braking hydraulic pressure to output the predicted friction coefficient to a braking control logic portion of the controller, wherein the braking control logic portion is engaged to the friction coefficient model.

14. The braking control method of claim 12, wherein the disc initial temperature is an outside air temperature.

15. The braking control method of claim 11, further including:
- inputting a braking hydraulic signal applied to the braking apparatus to the friction coefficient model through a friction coefficient model input portion of the controller, wherein the friction coefficient model input portion is engaged to the friction coefficient model.

16. The braking control method of claim 11,
- wherein the determining of the regenerative braking execution amount and the execution hydraulic braking torque includes:
- determining a total braking torque for satisfying a driver demand braking torque; and
- determining the execution hydraulic braking torque by subtracting the regenerative braking execution amount from the total braking torque.

17. The braking control method of claim 11, wherein the controller includes:
- a processor; and
- a non-transitory storage medium on which a program for performing the braking control method of claim 11 is recorded and executed by the processor.

\* \* \* \* \*